W. B. TUCKER.

WATCH-REGULATOR.

No. 7,057 Reissued April 18, 1876.

Witnesses:

Geo. N. Howard.

H. A. Daniels

Inventor:

William B. Tucker

By his Attorney

Z. C. Robbins

N. PETERS, PHOTO-LITHOGRAPHER, WASHINGTON, D. C.

UNITED STATES PATENT OFFICE

WILLIAM B. TUCKER, OF HILLSBOROUGH, OHIO.

IMPROVEMENT IN WATCH-REGULATORS.

Specification forming part of Letters Patent No. 68,324, dated August 27, 1867; reissue No. 7,057, dated April 18, 1876; application filed April 25, 1872.

*To all whom it may concern:*

Be it known that I, WILLIAM B. TUCKER, of Hillsborough, in the county of Highland and State of Ohio, have invented a new and useful Attachment to the Regulators of Watches and other Time-Pieces; and I do hereby declare that the following is a full and exact description thereof, reference being had to the accompanying drawings, which form a part of this specification—

Figure 1:
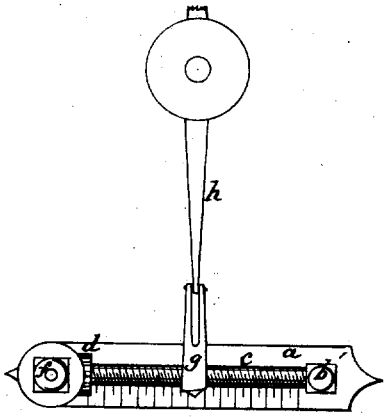
Figure 2:
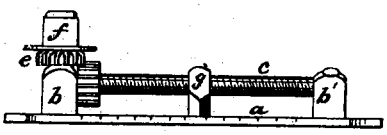

Figure 1 being a top view of my said attachment, and Fig. 2 a side view of the same, the said drawings being of an exaggerated size for the purpose of more clearly representing the invention.

Similar letters refer to corresponding parts in each of the drawings.

The object of my invention is to provide a cheap watch-regulator, having a positive motion and detent at any particular point.

My invention consists in attaching a nut directly to the point of the regulating-hand, said nut moving on a transverse endless screw journaled in standards rising from a base-plate provided with a graduated scale.

A thin base-plate, *a*, which has a graduated scale formed upon one side of it, receives and supports the two knobs *b b'*, which serve as the bearings of the horizontal screw-shaft *c*. The knob *b* also receives a spindle descending vertically from the center of the toothed wheel *e*, which gears into the toothed wheel *d* on the end of the screw-shaft *c*. An angular stem, *f*, rises above the center of the toothed wheel *e*, which corresponds in size and shape with the angular end of the winding-arbor of the watch. A nut, *g*, which works upon the screw-shaft *c*, is jointed to the extremity of the regulator *h*, and a sharp point at the front end of said nut indicates upon the scale on the base-plate *a* the exact amount of movement that may be imparted to the nut by turning the screw-shaft *c*, and consequently the amount of movement that may be thereby imparted to the regulator.

The same key that is employed for winding the watch may be used for adjusting the regulator.

The base-plate *a* of my improved watch-regulator attachment may be secured to the regulator-plate or half plate in any suitable manner.

What I claim as my invention, and desire to secure by Letters Patent, is—

1. A nut, *g*, attached directly to the point of and in combination with the regulator *h* and screw *c*, substantially as set forth.

2. The combination of the scale base-plate *a*, supporting-knobs *b b'*, horizontal screw-shaft *c*, toothed wheels *d* and *e*, winding-arbor *f*, and the attaching and indicating nut *g*, for operating the regulator of a watch or other time-keeper, substantially in the manner herein set forth.

In testimony that the foregoing is a full and clear specification of my improvement in the regulators of watches I hereunto subscribe my name this 26th day of February, 1872.

WILLIAM B. TUCKER.

Witnesses:

H. CASBATT,

ISAAC W. TUCKER.